June 2, 1931.  F. H. GREGORY  1,808,034
SACK
Filed April 30, 1930
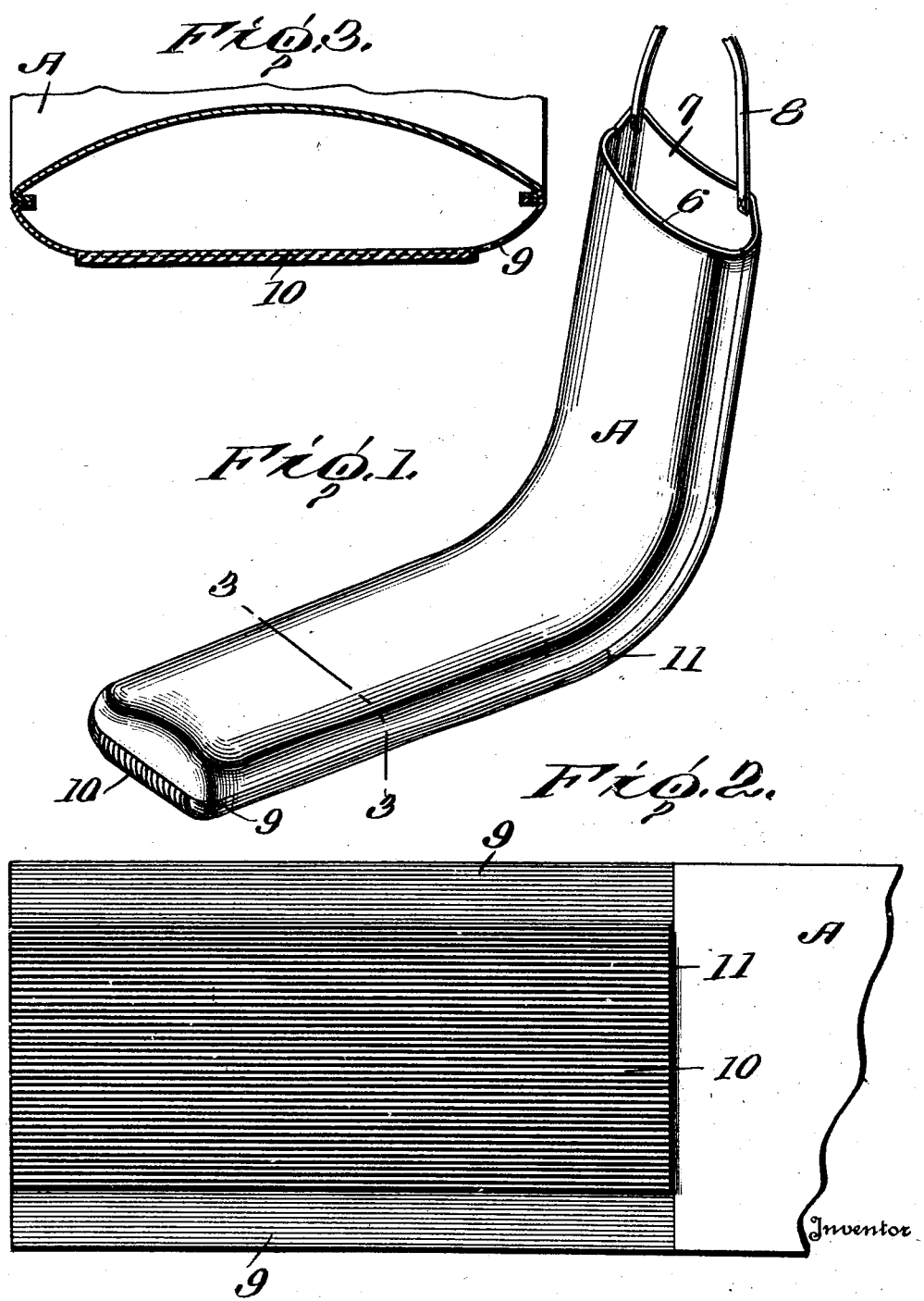

Patented June 2, 1931

1,808,034

UNITED STATES PATENT OFFICE

FRANK H. GREGORY, OF McALLEN, TEXAS

SACK

Application filed April 30, 1930. Serial No. 448,663.

This invention relates to improvements in sacks for use in picking cotton.

The primary object of the invention is the provision of a sack of greatly increased durability and life.

In the drawings:

Figure 1 is a perspective view of a cotton sack incorporating the improved invention.

Fig. 2 is a fragmentary bottom plan view of the sack.

Fig. 3 is a transverse vertical sectional view taken on the line 3—3 of Figure 1.

As is well known, persons engaged in the picking of cotton from the plants use a large sack or bag which is supported from one shoulder and drags along the ground as the person progresses along the rows of plants in the field.

As the result of this dragging the sack wears away at that portion which engages the ground so that the bag becomes useless or is a source of constant expense and annoyance through the necessity of patching or mending. The life of a cotton sack is not great because they are usually made of eight ounce duck material and material of this weight does not wear a great length of time when dragged along the ground and forced in frictional contact with the ground through a constant amount of weight of picked cotton.

To overcome the expense and annoyance of patching the sacks and to provide sack which through proven tests has outworn more than twenty ordinary cotton sacks, I have conceived the following invention.

By reference to the drawings it will be seen that the sack is designated at A and is a tubular member having a closed end 5 and an open end 6 beyond which extends what is usually termed an apron 7 to which is attached the strap or harness 8 which goes over the shoulder of the picker so that the bag can be dragged along the ground in back of him.

The apron 7 is for the purpose of facilitating the dropping of the cotton into the mouth of the sack so that it will find its way to the lower end of the sack or that portion of the sack which is dragging along the ground so that the weight of the picked cotton is upon the ground rather than upon the shoulders or body of the picker.

Cotton sacks are made in different lengths but a more or less standard length is seven feet. Of this seven foot length a certain portion engages the ground. The amount which does drag upon the ground would of course vary to some extent in proportion to the height of the picker.

My present inventive concept is that of providing a reenforcing strip upon that portion of the under side of the sack which engages or might engage the ground when the sack is being dragged.

To this end that portion of the under side of the sack designated at 9 is provided with a gum coating to which is vulcanized a rubber tread strip 10 which extends from the closed end 5 of the back to a point 11, which point is sufficiently far up the length of the bag to insure that all of the ground engaging portion of the bag is provided with the rubber strip.

It will of course be readily understood that this bag or sack is made of duck material and that the gum coating is applied to the ordinary sack material and that the rubber tread is vulcanized upon the ordinary gum coated bag material.

It has been found that it is not necessary to make the rubber tread as wide as the bag and to save expense in the manufacture this rubber strip is slightly less in width than the width of the bag as is clearly indicated in the drawings. At the edges of the under side of the bag beyond the rubber tread the duck material carries the gum coat which in itself adds to the durability and friction wear-resisting qualities of the bag.

The gum coating to the bag portion provides an adhesive medium to aid in the vulcanization of the rubber tread to the sack with the result that when the tread is once vulcanized in place it remains intact throughout the length of the life of the sack.

A bag built in accordance with this invention can conceivably be made in two ways, either that of vulcanizing to each individual bag the tread strip or that of preparing in great lengths duck of a width equal to the width of the bag which is gum coated and carries the rubber strip vulcanized to it and then cutting from this duck strip appropriate lengths to be incorporated into each individual bag.

From the standpoint of economy in manufacture it has been found the better practice to cut from a previously prepared piece of duck having the rubber tread pieces of the proper length and then sewing these lengths into each individual bag.

A bag built in accordance with the present improvement has by actual tests outworn more than twenty sacks of the ordinary and usual construction with the result that a bag built in accordance with the present invention is of much longer life than the ordinary cotton sack and enables a material saving to the user.

Having thus described my invention what I claim and desire to secure by Letters Patent is:

In a cotton picker's bag adapted to be dragged along the ground, that portion of the under side of the bag which in use engages the ground being provided with a gum coat throughout its width, and a rubber ground engaging tread of a width slightly less than the width of the bag vulcanized to the gum coated portion of the bag and extending from the closed end of the bag towards the open end of the bag and ending at a point beyond that portion of the bag which might engage the ground when the bag is in use.

In testimony whereof I hereunto affix my signature.

FRANK H. GREGORY.